I. W. Burch,
Buckle
No. 97,871.    Patented Dec. 14, 1869.

Witnesses;
Chas. Nida
W F Clark

Inventor;
I W Burch
per Munn
Attys

United States Patent Office.

ISAAC W. BURCH, OF FAYETTE, MISSISSIPPI.

Letters Patent No. 97,871, dated December 14, 1869.

IMPROVEMENT IN BUCKLES.

The Schedule referred to in these Letters Patent and making part of the same.

*To all whom it may concern:*

Be it known that I, ISAAC W. BURCH, of Fayette, in the county of Jefferson, and State of Mississippi, have invented a new and useful Improvement in Harness-Buckles; and I do hereby declare that the following is a full, clear, and exact description thereof, which will enable those skilled in the art to make and use the same, reference being had to the accompanying drawings, forming part of this specification.

The object of this invention is to provide buckles for harness, and other uses, with tongues constructed in the form of leather-punches, whereby they may be used at any time required for punching holes.

Figure 1:
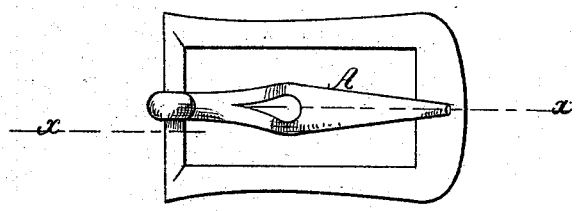
Figure 1 represents a plan view of a buckle constructed according to my improvement.
Figure 2:
Figure 2 represents a sectional elevation of the same, taken on the line X X of fig. 1.

I propose to make the tongues A in the form of leather-punches, and of suitable material to answer for punching the holes in the straps as required.

It is often necessary, in the use of harness, to be able to punch new holes in the straps for buckling in new places, as when straps break, and have to be fixed up temporarily, or when the straps have to be let out or taken up to an unusual degree, in which cases these buckles will be found of great advantage.

Having thus described my invention,

What I claim as new, and desire to secure by Letters Patent, is—

A compound harness-buckle and punch, composed of an ordinary frame and hollow punch-tongue A, as an article of manufacture.

ISAAC W. BURCH.

Witnesses:
GEO. W. SHACKLEFORD,
DAVID HARRISON.